June 8, 1948. W. S. CLOUD 2,442,757
METHOD AND MEANS FOR PREVENTING TEARS IN THERMOPLASTIC MATERIAL
Filed April 24, 1944 2 Sheets-Sheet 1

Inventor
William S. Cloud.

June 8, 1948.  W. S. CLOUD  2,442,757
METHOD AND MEANS FOR PREVENTING TEARS IN THERMOPLASTIC MATERIAL
Filed April 24, 1944  2 Sheets-Sheet 2
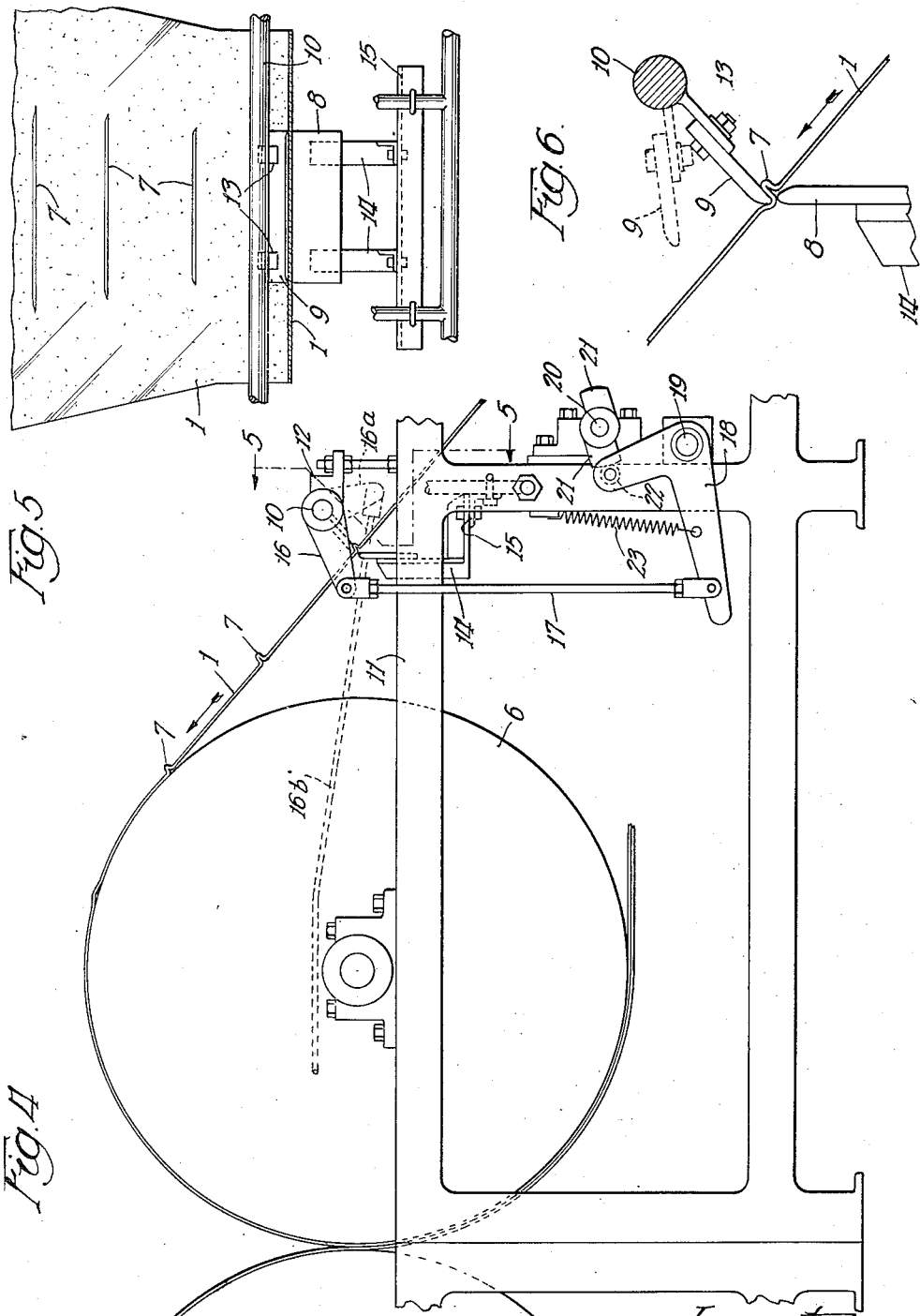
Inventor
William S. Cloud.
By Laugam mmm Atty.

Patented June 8, 1948

2,442,757

UNITED STATES PATENT OFFICE 2,442,757

METHOD AND MEANS FOR PREVENTING TEARS IN THERMOPLASTIC MATERIAL

William S. Cloud, Wilmette, Ill.

Application April 24, 1944, Serial No. 532,562

6 Claims. (Cl. 18—1)

This invention relates to improvements in machines for stretching sheets of thermoplastic material, and more particularly to a device forming means for preventing imperfections in thermoplastic material from developing into tears or runs when stretched.

It has been found that when thermoplastic material is heated and stretched, imperfections in the material may develop into small holes, which when force is applied to stretch the material, quickly develop into tears which will run the entire length of the sheet and destroy its usefulness as a wrapping material for packaging purposes.

For example, this applicant has developed a machine for wrapping articles in rubber hydrochloride, known to the trade as Pliofilm, disclosed in his co-pending application, Serial No. 436,666, filed March 28, 1942 (abandoned June 17, 1946, after filing of related application Serial No. 692,-323), in which a rolled strip of Pliofilm is advanced over a heating drum, then grasped at its edges and stretched transversely and then longitudinally its length before entering the wrapping device. After the Pliofilm has been heated, the force applied to impart the stretch sometimes causes any imperfections that may appear in the material to develop into small holes which quickly expand into longitudinal tears, rapidly continuing to move backward along the strip to a region of equilibrium at which the stretching force continuously splits the oncoming sheet and destroys the purpose for which it is being stretched.

The present application is directed solely to the feature of preventing tears in the web being stretched, and other features relating to the stretching of the web are reserved for application Serial No. 692,323.

It is an object of this invention to provide in such a machine means to prevent the development of such holes in the thermoplastic material from expanding as the material is being stretched to form tears that split the sheet.

With this and other objects in view, reference is made to the accompanying sheets of drawings which illustrate a form of this invention with the understanding that detail changes may be made without departing from the scope thereof, and with the further understanding that, while this invention is shown and described in one particular use, it is not restricted thereto and may be applied wherever thermoplastic material is stretched for any purpose whatsoever.

In the drawings:

Figure 4 is a fragmentary view in side elevation illustrating the operation of the crimping device.

Figure 5 is a fragmentary view in section taken on the line 5—5 looking in the direction of the arrows.

Figure 6 is an enlarged detail view illustrating the formation of a fold, crimp or rib in the strip.

In recent years, there has been a demand for a material to be used for packaging that will conform closely to the shape and size of the articles with which it is used and at the same time afford a protective covering. A material which answers this demand is the rubber hydrochloride product sold by the Goodyear Tire and Rubber Company, Inc., of Akron, Ohio, under the trade name "Pliofilm."

It is recognized that Pliofilm is a substantially moisture proof, transparent sheet material that becomes plastic when heated, and in this condition, it can be stretched easily to a considerable degree. Pliofilm has been obtainable on the market in sheets of 100 or 120 gauge, $100/100000$ or $120/100000$ inch in thickness. It is also recognized, if heated sheets of Pliofilm are placed together, the sheets become attached or sealed to each other.

Figure 1:
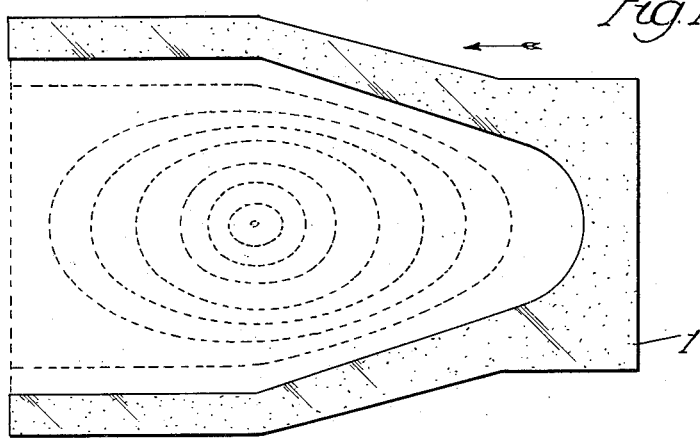
Figure 1 is a fragmentary, top plan view of a strip of Pliofilm as it enters a wrapping machine, illustrating diagrammatically the effect upon a strip of Pliofilm of the appearance of a hole in the material when being stretched.
Figure 2:
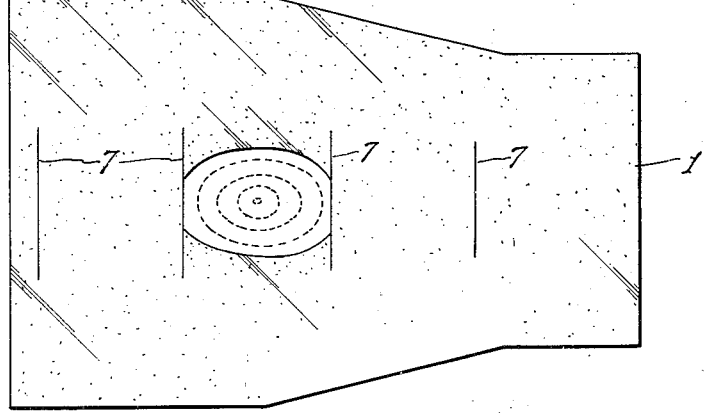
Figure 2 is a view similar to Figure 1 illustrating diagrammatically the manner in which this invention prevents the spreading of a tear in the strip.

This applicant has developed a method and machine, as disclosed in his prior co-pending application, Serial No. 436,666, filed March 28, 1942, now abandoned, whereby Pliofilm is stretched first laterally, or transverse its length, and then longitudinally its length to a thickness approximately 20 gauge, $20/100000$ inch, prior to the wrapping of an article therein. During the operation of this machine in stretching the thermoplastic Pliofilm, it has been found that imperceptible imperfections, or weak spots in the stock become apparent, form small holes in the heated film, and as it is stretched, develop into larger and larger holes, forming in effect, longitudinal runs in the direction of the length of the sheet, shown diagrammatically in Figure 1. Reference is made to the applicant's said prior co-pending application as disclosing the means for imparting the lateral stretch and the longitudinal stretch to the heated thermoplastic film.

This applicant has discovered that, by forming a plurality of equally spaced apart lateral or transverse folds, crimps or ribs in the heated thermoplastic film just before the lateral stretch is initiated, the creating and expanding of a hole in the sheet during the lateral stretching into a longitudinal run is confined or limited between the crimps so that but a limited portion of the sheet is rendered useless as a wrapper.

Figure 3:
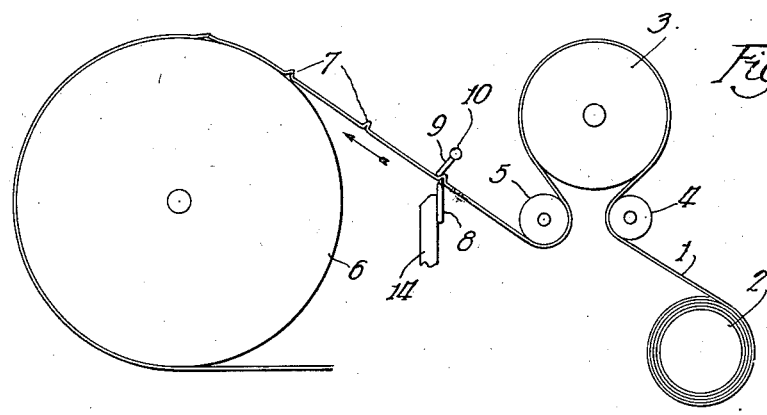
Figure 3 is a fragmentary view in vertical, longitudinal section, illustrating the formation of a fold, crimp or rib in the heated strip of thermoplastic material.

Figure 3 illustrates a strip of Pliofilm 1 unrolled from the roll 2 passing over the heating device 3 between the idlers 4 and 5 and then over a packaging drum 6, as generally disclosed in the applicant's said prior co-pending application. To form the lateral or transverse folds, crimps or ribs 7 in the strip, a fixed transverse abutment 8 is provided over which the heated strip passes in sliding contact. A movable abutment 9 is mounted on an oscillating transverse shaft 10 in such a manner that, as the free end of the movable abutment 9 approaches the free end of the fixed abutment 8, the strip traveling between them is momentarily retarded and builds up on the roll side of the abutments 8 and 9. The fold or folds in the thermoplastic strip thus formed seal the contacting surfaces to each other and produce a transverse crimp or rib 7, as shown in the enlarged detail view in Figure 6.

As shown in Figure 4, the trunnions of the packaging drum 6 are mounted in bearings upon the top 11 of the longitudinal side frames of the machine which also supports bearings 12 for the oscillating transverse shaft 10. The shaft 10 is provided with two radial extensions 13 to which the movable abutment 9 is adjustably secured. The fixed abutment 8 is supported upon two angle irons 14 and cross piece 15 adjustably mounted upon the side frame. The shaft 10 is oscillated to swing above the upper surface of the strip of film 1 by an arm 16 carried on one end of the shaft 10 pivotally connected by a link 17 to one end of a bell crank lever 18 swinging at its apex upon a pivot 19 mounted on the side frame of the machine. A transverse shaft 20 mounted in bearings on the side frame carries at one end oppositely disposed cams 21 and is rotated by the same source of power that rotates the drum 6 causing the cams 21 to successively wipe over a roller 22 carried on the free arm of the bell crank lever 18 which causes said lever to oscillate against the tension of a spring 23 connected to the opposite arm thereof and anchored on the side frame.

As the machine in the applicant's said co-pending application advances strips of thermoplastic film from opposite ends of the machine to pass over similar contacting packaging drums, this invention contemplates providing folds, crimps or ribs in each strip by a similar means. Having illustrated and described the folding or crimping mechanism at one end, it is not thought necessary to illustrate the same mechanism at the opposite end as the shaft for corresponding to the shaft 10 may be oscillated in unison therewith by providing a second arm 16a on shaft 10 and pivotally connecting it to a similar arm on the end of a corresponding shaft at the other end of the machine by a pivoted link 16b, the arm 16a and link 16b being shown in dotted lines in Figure 4.

It has been found that holes and runs which occur during the lateral stretching are usually adjacent the longitudinal center of the strip so that it is not necessary to extend the abutments 8 and 9 across the entire width of the strip. It has also been found that after the lateral stretch has been accomplished and the longitudinal stretch is imparted, the thermoplastic material of the strip still being in a heated condition, the longitudinal stretching partially pulls out the folds 7 formed in strips so they become unobtrusive in the film as it is being employed to wrap articles.

What I claim is:

1. The method of progressively stretching a web of plastic material including the steps of forming a series of longitudinally spaced laterally extending sealed folds in the web and stretching the web having said folds therein by moving its sides apart sufficiently to substantially reduce the thickness of the web.

2. Apparatus for progressively stretching a web of plastic material including means for forming in the web a series of longitudinally spaced laterally extending sealed folds and means for thereafter moving apart the sides of the web having said folds therein sufficiently to substantially reduce the thickness of the web.

3. The method of progressively stretching a web of plastic material including the steps of advancing the web in plastic and tacky condition, successively retarding a small portion of the web intermediate its sides long enough to cause a piling up of the advancing web and thereby produce a laterally extending sealed fold, and stretching the web having said folds therein by moving its sides apart sufficiently to substantially reduce the thickness of the web.

4. Apparatus for progressively stretching a web of plastic material including means for advancing the web in plastic and tacky condition, means for engaging a small portion of the advancing web intermediate of its sides and holding it long enough to retard the same and cause a piling up of the advancing web to produce a laterally extending sealed fold in the web, and means for thereafter moving apart the sides of the web having said folds therein sufficiently to substantially reduce the thickness of the web.

5. Apparatus for progressively stretching a web of plastic material including means for advancing the web in plastic and tacky condition, means for engaging a small portion of the advancing web intermediate of its sides and holding it long enough to retard the same and cause a piling up of the advancing web to produce a laterally extending sealed fold in the web, and means for thereafter moving apart various portions of the web having said folds therein sufficiently to substantially reduce the thickness of the web.

6. Apparatus for progressively stretching a web of plastic material including means for forming in the web a series of longitudinally spaced laterally extending sealed folds and means for thereafter moving apart portions of the web having said folds therein sufficiently to substantially reduce the thickness of the web.

WILLIAM S. CLOUD.

REFERENCES CITED

The following references are of record in the file of this patent:

UNITED STATES PATENTS

| Number | Name | Date |
| --- | --- | --- |
| 1,200,167 | Carter | Oct. 3, 1916 |
| 2,053,116 | Sperry | Sept. 1, 1936 |
| 2,177,425 | Barker | Oct. 24, 1939 |
| 2,240,274 | Wade | Apr. 29, 1941 |
| 2,327,170 | Calvert | Aug. 17, 1943 |